(12) United States Patent
Roos et al.

(10) Patent No.: US 9,566,664 B2
(45) Date of Patent: Feb. 14, 2017

(54) METHOD FOR LASER REMOTE PROCESSING OF A WORKPIECE ON A FILLET AND DEVICE THEREFOR

(71) Applicant: Bayerische Motoren Werke Aktiengesellschaft, Munich (DE)

(72) Inventors: Christian Roos, Munich (DE); Hans Langrieger, Munich (DE); Florian Oefele, Lenggries (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 311 days.

(21) Appl. No.: 14/495,315

(22) Filed: Sep. 24, 2014

(65) Prior Publication Data

US 2015/0083697 A1 Mar. 26, 2015

(30) Foreign Application Priority Data

Sep. 25, 2013 (DE) .................. 10 2013 219 220

(51) Int. Cl.
*B23K 26/04* (2014.01)
*B23K 26/03* (2006.01)
*B23K 26/24* (2014.01)

(52) U.S. Cl.
CPC ............ *B23K 26/03* (2013.01); *B23K 26/032* (2013.01); *B23K 26/043* (2013.01); *B23K 26/044* (2015.10); *B23K 26/045* (2013.01); *B23K 26/082* (2015.10); *B23K 26/242* (2015.10); *B23K 26/243* (2013.01); *B23K 26/042* (2015.10)

(58) Field of Classification Search
CPC ... B23K 26/042; B23K 26/043; B23K 26/044; B23K 26/045; B23K 26/242; B23K 26/243

USPC .......................... 219/121.61–121.64, 121.81, 121.82,219/121.85
See application file for complete search history.

(56) References Cited

U.S. PATENT DOCUMENTS

| | | | | |
|---|---|---|---|---|
| 3,535,488 A | * | 10/1970 | Kitchin ................. | B23K 15/02 219/121.14 |
| 4,468,565 A | * | 8/1984 | Blair ..................... | B82Y 10/00 219/121.26 |
| 5,572,102 A | * | 11/1996 | Goodfellow ........... | B25J 9/1697 219/124.1 |

(Continued)

FOREIGN PATENT DOCUMENTS

DE 10 2009 003 355 A1 7/2010
EP 2 196 279 A2 6/2010

OTHER PUBLICATIONS

German Search Report dated Mar. 10, 2014, with Statement of Relevancy (Six (6) pages).

*Primary Examiner* — Samuel M Heinrich
(74) *Attorney, Agent, or Firm* — Crowell & Moring LLP (57) ABSTRACT

The invention relates to a method for laser remote processing of a component on a fillet, wherein a laser beam is directed by means of a scanner device onto the component and guided over said component. The working range of the laser beam on the workpiece is illuminated with illuminating radiation and is captured by at least one image capturing unit. The illuminating radiation is directed onto the component at an angle of attack which is set depending the fillet geometry of the component. The captured image data are evaluated automatically and, with the aid of the evaluation, if appropriate, an automatic correction of the path of the laser beam is carried out.

20 Claims, 6 Drawing Sheets

(56) References Cited

U.S. PATENT DOCUMENTS

2010/0268372 A1* 10/2010 Zurbuchen .............. B29C 65/02
                                                          700/122
2014/0175068 A1*  6/2014 Poss .................... B23K 26/044
                                                       219/121.64

* cited by examiner

METHOD FOR LASER REMOTE PROCESSING OF A WORKPIECE ON A FILLET AND DEVICE THEREFOR

CROSS REFERENCE TO RELATED APPLICATIONS

This application claims priority under 35 U.S.C. §119 from German Patent Application No. 10 2013 219 220.7, filed Sep. 25, 2013, the entire disclosure of which is herein expressly incorporated by reference.

BACKGROUND AND SUMMARY OF THE INVENTION

The invention relates to a method for laser remote processing of a workpiece on a fillet as well as a device therefor and in particular a method and a device for quality improvement for the remote laser welding of end fillet welds.

Laser remote processing is understood as a processing method which is carried out using the scanner technology or a scanner device. In this regard, a laser beam can be deflected by means of at least one movable mirror and positioned on or guided over the workpiece to be processed, so that very high processing speeds can be achieved. Furthermore the scanner device can have lens systems for focusing of the laser beam and/or further movable or fixed mirrors. The processing with the laser beam may be welding, melting or cutting.

Furthermore, the scanner device can be mounted on a movable mechanism. This may for example be a robot, a portal or the like, so that a movement of the scanner device along and/or around at least two axes is enabled. As a result, the working area of the laser remote system is increased. By simultaneous movement of the scanner device by means of the mechanism and movement of the laser beam by means of the scanner device a so-called "on the fly" processing can be implemented, so that the processing times are further reduced. However, the synchronization of movements, which is necessary in this case, brings with it certain requirements for precision of positioning. The requirement for precision of positioning is increased by the large working distance between the scanner device and the workpiece, which in laser remote systems usually amounts to at least 0.5 meter.

Thus, the requirements for precision of positioning described above result in variations between the desired course and the actual path of the laser on the workpiece. These variations are, in particular, critical when the workpiece is to be processed on a fillet.

In the vicinity of the fillet, the workpiece has a significant change in height. If the laser beam deviates from a predetermined position, then the laser beam can no longer be correctly focused on the workpiece. If the processing is welding, such as for example the formation of a fillet weld in the fillet, then faulty positioning leads to welding errors. In particular, in the welding of two metal sheets positioned in a lap joint for formation of an end fillet weld, positioning on the upper metal sheet leads to defective penetration welding and considerable spatter due to lack of zinc degassing. Likewise, positioning on the lower sheet leads to holes. Furthermore, the quality of the seam drops when a predetermined gap width is not maintained, since the connection width of the weld seam is reduced.

Thus, the object of the present invention is to provide a method for remote laser processing of a workpiece on a fillet as well as a device for carrying out the method, by which the process stability and process quality can be improved.

This object is achieved by a method and a device according to the invention with the features set forth in the independent claims.

In the method according to the invention, the working range of the laser beam on the workpiece is illuminated by illuminating radiation and is detected by at least a first image capturing unit. The captured image data are automatically evaluated and, if appropriate, an automatic correction of the path of the laser beam is carried out on the basis of the evaluation.

The workpiece may be a single component. Alternatively, the workpiece may also consist of two or more components. Metal shaped bodies, such as for example metal profiles, can be used as components. The components may also, for example, be metal sheets, which may be flat metal sheets or three-dimensional shaped metal sheets. These are preferably steel sheets. These may be for example zinc- or aluminum-coated steel sheets which are provided with an anti-corrosion coating based on zinc or aluminum.

Fastening elements, which may for example be cylindrical or in the form of spherical segments, can be fastened on the metal sheets.

A workpiece region in which two adjacent surfaces are inclined at an angle of less than 180° relative to one another is designated as a fillet. The fillet may be designed as an edge, alternatively the fillet may be formed in dish shape between the two surfaces, i.e. the delimiting surfaces merge into one another with a radius in the region of the fillet. The fillet may be formed for example by two adjacent straight areas which are disposed as a lap joint, T joint or angle joint, or for example by a surface which is cylindrical or in the form of spherical segments, which is disposed adjacent to a straight surface. The two areas delimiting the fillet can adjoin one another, but also there may be a gap between the two areas. The fillet may be constructed on a component, for example the component may be L-shaped or a web may project from the component. Alternatively, the fillet can also be formed by a corresponding arrangement of two components. For example, two components can be disposed partially overlapping, so that the fillet is produced for example between the end face of the upper component and the surface of the lower component. Likewise, the fillet can also be formed by two components which are disposed one above the other and partially penetrate one another.

The method according to the invention uses optical monitoring of the working range of the laser, wherein both data regarding the actual position of the laser beam on the workpiece and also data on the position of the fillet are evaluated.

In this case, a range which encompasses both the process zone and the process advance zone is designated as the working range of the laser. In this case the keyhole, i.e. the immediate impact zone of the laser beam, and the adjacent melting zone are designated as the process zone. The process advance zone is located before the melting zone in the processing direction. The immediate process advance zone designates the area which is located less than 2 mm before the melting zone in the processing direction.

The illuminating radiation may be visible light, alternatively UV or infrared radiation can be used. In one embodiment, the illuminating radiation is coupled into the beam path of the processing laser beam and is guided coaxially with respect thereto on the workpiece. In this regard, an additional optical unit and/or mirror can be provided in the scanner device. By way of example, the illuminating radiation and the processing laser beam are simultaneously directed onto the workpiece. In a further embodiment the illuminating radiation can be guided over the workpiece by a second scanner device, i.e. a scanner device other than the one used for the processing laser beam. The illuminating radiation is preferably directed radiation, for example it may be laser radiation. The wavelength of the illuminating radiation is preferably different from the wavelength of the laser beam for processing.

The working range of the (processing) laser beam is located in the field of view of at least a first image capturing unit. In one embodiment, the working range is located in the field of view of a first and a second image capturing unit. The first or second image capturing unit may, for example, have one or more sensors or cameras and may optionally comprise a computer unit. The image capturing unit captures images from the working range of the laser. The capture preferably takes place during the processing. The image capturing unit captures a part of the illuminating radiation which is reflected from the working range of the workpiece. Furthermore the image capturing unit may capture process light. The process light is composed of radiation which is reflected by the processing site and of secondary radiation which, during the processing, results from an interaction between the workpiece and the laser beam.

The recorded image data can be evaluated automatically. The evaluation of the image data takes place, for example, taking into account the illumination data and/or the output data of the processing laser using an image processing algorithm. An evaluation takes place, for example, with regard to the position of the fillet and with regard to the actual position of the processing laser beam. According to the results of the evaluation, the path of the laser beam is adapted for processing in order to correspond as closely as possible to the desired path.

According to the invention, the illuminating radiation is directed onto the workpiece at an angle of attack which is set as a function of the fillet geometry of the workpiece. In this case, the angle of attack is the lateral angle of attack, that is to say the inclination of the beam transversely with respect to the processing direction or weld seam. The angle of attack designates the angle at which the laser beam is inclined relative to the vertical onto the surface of the workpiece facing the scanner device. It has been shown that a reliable and precise edge recognition can also be ensured for difficult fillet geometries by the choice of an angle of attack which is dependent upon the geometry of the fillet. In particular, the angle of attack is set depending upon the fillet angle, i.e. the angle enclosed by the two areas delimiting the fillet. Thus, the process stability is considerably improved by a simple measure. The fillet angle can be determined, for example, by a measurement on the component before the start of processing. Thus, the method is suitable in particular for the processing of sheared metal sheets, for which a shearing angle of approximately 90° frequently cannot be ensured or which have phases or flash on the end face.

In one embodiment, the illuminating radiation which is reflected out of the immediate process advance zone is evaluated in order to determine the location of the fillet or of the edge configuration. In this way, a match can be determined between the actual position of the laser beam and the further edge configuration or fillet configuration. Thus, the quality of the beam correction can be improved by comparison with a determination of the edge configuration at the level of the processing laser.

In a further configuration, the edge recognition takes place in that a second scanner device with a second image capturing unit is directed onto a following processing site. The following processing site may, for example, be a few millimeters or a few centimeters away from the current processing site, i.e. before the processing site in the processing direction. Thus, at the following joining point the actual edge position can already be recognized and fed back to the controller as an adjustment value, whilst the processing is still taking place on the previous processing site.

The evaluation of the image data takes place preferably by determination of a grey scale value. For the data from the process advance zone, for example, the distribution of the grey scale values transversely with respect to the processing direction gives information regarding the component geometry. For example, the position of the fillet or of the edge can be determined from a maximum or minimum of the grey scale values. By a further comparison with the current position of the laser, the further path of the laser can be adapted to the configuration of the fillet and faulty positioning can be avoided in the future.

Further process reliability can be obtained in that the image data with regard to the contrast are evaluated. Increased soiling of the protective glass which protects the image capturing unit against soiling by process gases, such as for example welding fume and spray, is accompanied by a decrease in the contrast of the capture images. The monitoring of a sufficient contrast can prevent the failure of the edge detection in that, for example, when a predetermined threshold value is reached, a signal is emitted to replace the protective glass.

Because of the increase in the process reliability described above with regard to the edge or fillet recognition, the method is suitable in particular for the formation of a fillet weld in the fillet. The fillet weld may be produced as a continuous seam or with interruptions of the seam.

Moreover, ideal degassing conditions are produced by the provision of a fillet weld, and for this reason the method is suitable in particular for connecting to one another two metal sheets disposed in a lap joint by means of an end fillet weld, i.e. a seam between the end face of one metal sheet and the adjacent contact surface of the other metal sheet. Preferably, the metal sheets can be connected without a gap (so-called zero gap). The method is suitable in particular for the welding of metal sheets which have a coating comprising zinc or aluminum. Thus, the method is also suitable for mass production in vehicle bodywork construction.

In a further embodiment, the image data are evaluated in order to determine a gap dimension on the fillet and optionally to correct the position of the laser beam. In this way it is possible in a simple but effective manner to prevent the occurrence of welding errors (for example due to a reduced connection width) due to variations in the gap dimension and resulting in a reduction in the process reliability or quality. Thus, variations in the gap dimensions, which cannot be completely prevented because of component tolerances or faulty clamping of the components, can be compensated for by appropriate adaptation of the path or the focus of the laser beam. For example, by beam oscillation more material can be melted for the joint.

The determination of the gap dimension can, for example, be obtained from the grey scale values of the image data. Thus, a gap in the grey scale representation appears for example as a dark region between two light regions. A conclusion as to the gap width can be drawn from the width of the region. The control device carries out corresponding changes to the beam guiding, for example, changing the position or the focus location.

In a further embodiment, the process reliability is further improved in that additionally the process light is evaluated in order to recognize remediable processing errors. Because of faulty positioning of the laser relative to the fillet, an incorrect processing result may be produced, but can still be remedied. For example, in the case of a fillet seam weld on the lap joint, the laser beam can only be positioned on the upper sheet. The resulting lack of penetration welding can be recognized in the process light, for example, by the fact that in the grey scale representation no black spot can be seen in the process light. However, such a process error can still be corrected, which in the present method can advantageously be carried out immediately after the evaluation in the processing method. In this case, the control device carries out a corresponding correction of the path of the laser beam in order to direct the laser beam, for example, again over an incorrect portion of the path.

Furthermore, the process reliability can be improved in that the image data from the process zone are evaluated in order to recognize errors which can no longer be remedied and if appropriate to generate an error signal. Such errors may occur, for example, if holes have been produced in the workpiece due to faulty positioning. For example, the formation of holes is associated with a collapse of the keyhole and consequently can be recognized by the absence of the process light. An error signal may be emitted, for example, in the form of an electrical signal, resulting in interruption of the processing operation, for example. Alternatively, the error signal may also be an identification of the workpiece by, for example, a marking. For example, the control device may be configured in order to generate the error signal or to adjust and direct the laser beam on the tool for application of the identification. With the aid of the error signal the workpiece can be discarded without a renewed inspection being necessary.

By the use of a second scanner device comprising a second image capturing unit and a second illumination device, an improved quality recognition can be achieved. For example, a greater flexibility in the irradiation of the relevant location, such as for example the weld seam, is possible. As a result, the reliable evaluation of the weld seam is ensured.

For the described evaluations suitable evaluation algorithms are used which are known from the prior art.

The method described above for seam tracking, in combination with the various evaluations described, ensures a process reliability for the laser remote processing of a component with a fillet, in particular for a fillet seam weld, which achieves the necessary dimension for industrial use.

In a further embodiment, an additional processing laser beam is guided over the workpiece. The additional processing laser beam is preferably guided over the structural part by means of a scanner device other than the one guiding the processing laser beam, for example, by means of the second scanner device. This enables seam preparation and/or seam reworking.

The additional processing beam can also be guided coaxially with respect to the processing beam in order to increase the process stability.

In one embodiment, the additional processing laser beam is subsequently positioned on the location processed by the processing laser, for example the welded seam, so that for example a subsequent seam smoothing can be achieved.

Furthermore, in one embodiment the additional processing laser beam can be used for advance component preparation, such as for example for preheating, zinc removal or cleaning, by positioning on the edge/joint position which is not yet welded.

If, with the method, an end fillet weld is to be formed between an end face of an upper metal sheet and an adjacent contact surface of a lower metal sheet, then the regulation of the seam tracking can be further improved in that the upper metal sheet has, on its surface facing away from the lower metal sheet, a convex portion which adjoins the end face. At least a part of the convex portion faces in the direction of the scanner device, so that the reflection of the illuminating light is improved and the edge or fillet recognition can be increased. A corresponding shaping on the upper sheet can be achieved, for example, by a corresponding shaping on the pressing tools to produce the sheet blank.

The device according to the invention for laser remote processing of a component on a fillet comprises at least a first scanner device and at least one laser source, of which the laser beam can be directed over the workpiece by means of the first scanner device. A solid state laser is preferably used as the laser source, but alternatively gas or dye lasers can be used. The laser source preferably generates, for example, a laser beam with a wavelength of more than 1000 nanometers.

Furthermore, the device according to the invention has an illumination device from which the beam of light strikes the workpiece at an angle of attack, wherein the angle of attack is dependent upon a fillet geometry of the workpiece. The illumination device may be a light source which generates light in the visible frequency spectrum or UV or infrared light, for example a laser source. The illumination device preferably generates a directed radiation. The illumination device may preferably be a laser source. For example, it may be a laser source which generates a laser beam with a wavelength of more than 800 nanometers. The illumination device may be mounted on the scanner device or installed therein. Alternatively, the illumination device may be mounted on a second scanner device. The illumination device is preferably mounted so that the illuminating radiation is coupled into the beam path of the processing laser beam and can be directed coaxially with respect thereto by the movable mirror of the scanner device. The adjustment of the angle of attack of the illuminating radiation can take place, for example, by means of movable mirrors, such as for example the movable mirror of the scanner device. If the illuminating radiation is coupled into the beam path of the processing laser, the adjustment of the angle of attack preferably also takes place by means of the same mirror by which the processing laser beam is guided over the workpiece.

Furthermore, the device according to the invention has at least one image capturing unit, as described above, which captures image data from the processing region of the laser beam as well as a control device which, if need be, corrects the path of the (processing) laser beam with the aid of an evaluation of the captured image data.

The evaluation can be carried out by the at least one image capturing unit. Alternatively, the evaluation can also be carried out by the control device. The image capturing unit or the control device are configured appropriately for evaluation, for example they can include an evaluation unit, such as for example a microcontroller.

In order to be able to adjust or reset the path of the laser beam and the setting of the angle of attack of the illuminating radiation, the control device is appropriately configured and, for example, is connected via interfaces to the image capturing unit, the scanner device, the laser source for generation of the processing laser beam and the illumination source.

In one embodiment, the scanner device is mounted on a movable mechanism, such as for example a robot or a portal, so that laser processing "on the fly" is possible. In this case the control device is configured in order to synchronize and to control the necessary synchronization between the movements the movable mechanism and of the laser scanner.

If the method described above is carried out by the device according to the invention, then the same advantages and technical effects described there are achieved.

In one embodiment, the device has a second scanner device. This is mounted for example on the first scanner device. By means of control engineering the second scanner device can be incorporated into the control of the first scanner device, for example as additional axes. Alternatively the second scanner device can have a dedicated control.

Furthermore, the device can have an additional processing laser which can preferably be directed onto the component by means of the second scanner device. The additional processing laser may for example be a solid state laser or also a gas or dye laser. A diode laser is preferably used.

Furthermore, the device may have a second image capture device which is mounted on the second scanner device. The image capture device is preferably disposed coaxially with respect to the beam path of the additional processing laser.

Furthermore, a second illumination device can be provided on the second scanner device. The light from the second illumination device is guided by the second scanner device preferably coaxially with respect to the beam path of the additional processing laser.

Advantageous embodiments of the invention are disclosed by the subordinate claims and the embodiments.

The characteristics, features and advantages of this invention which are described above as well as the way in which these are achieved can be understood more clearly in connection with the following description of the embodiments. In so far as the expression "can" is used in this application, this relates both to the technical possibility and to the actual technical implementation.

Embodiments are explained below with reference to the appended drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
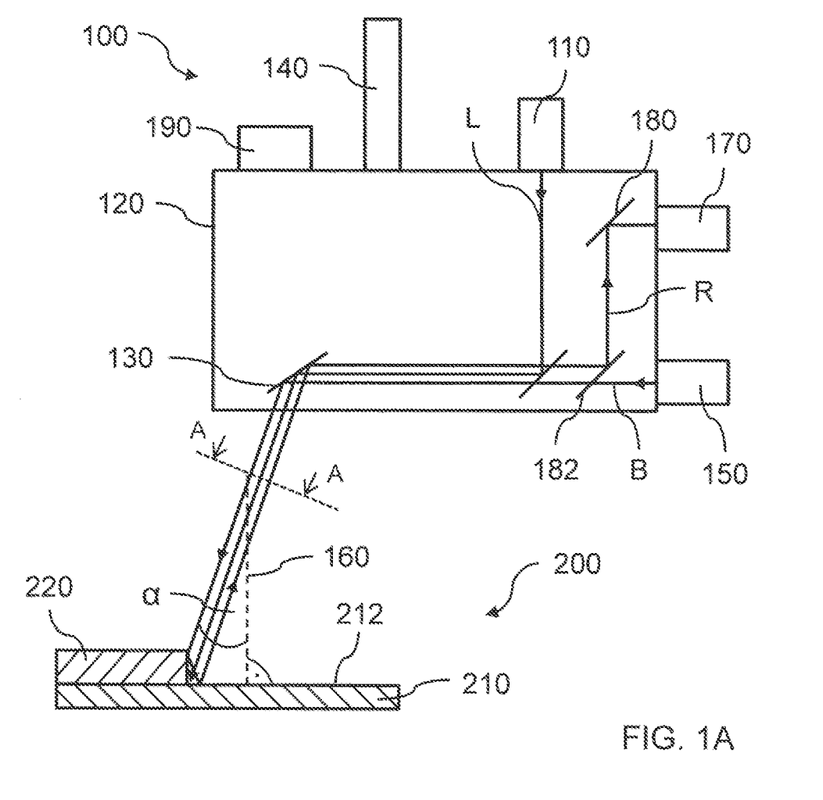
FIG. 1A shows a schematic representation of a device according to the invention for laser remote processing on a workpiece according to a first embodiment.

FIG. 1A shows a schematic representation of a device according to the invention for laser remote processing. The device 100 comprises a laser source 110 as well as a scanner device 120. In the scanner device 120 at least one movable mirror 130 is disposed, by which a laser beam L coming from the laser source 110 can be directed onto a workpiece 200 and moved over the latter. In the scanner device 120 an optical unit (not shown) can be provided for focusing of the laser beam L. Furthermore, the scanner device 210 is fastened to a movable mechanism 140 which enables an additional movement of the entire scanner device 120. Furthermore, the device 100 comprises an illumination device 150 in the form of a laser source, by which an illuminating radiation B is directed by means of the scanner device 120 onto the component 200. The illuminating radiation B is guided, at least in the section in which it exits from the scanner device 120, in the direction of the workpiece 200, coaxially with the laser beam L. According to FIG. 1A, the illuminating radiation is coupled in as a coaxial beam of light into the beam path of the laser beam L and is directed by means of the movable mirror 130 onto the workpiece 200. The laser beams L for processing and B for illumination coming from the scanner device 120 and striking the workpiece 200 exit from the scanner device 120 at an angle of attack α. The angle of attack α designates the angle at which the laser beam is inclined relative to the vertical 160 onto the surface 212 of the workpiece 200 facing the scanner device 120. FIG. 1A shows the lateral angle of attack α, i.e. the angle of attack transversely with respect to the processing direction. Furthermore, the laser beam L or B can also extend in the longitudinal direction at an angle not equal to 90° to the workpiece, depending upon whether piercing or dragging processing is required.

The workpiece 200 consists of a first component 210 and a second component 220 disposed above the first. In the embodiment shown in FIG. 1A, the components are metal sheets. The intended processing is the welding of the components 210 and 220 by means of an end fillet weld, and for this reason the component 220 is disposed partially overlapping above the component 210. This results in a stepped configuration of the component surface. Because of this stepped configuration a part of the illuminating radiation B striking the workpiece 200 is reflected back to the scanner device 120 as directed reflection coaxially with respect to the illuminating radiation B. This reflected radiation R is guided to an image capturing unit 170 which is mounted on the scanner device 120. The reflected beam R is directed by means of the mirrors 180, 182 to the image capturing unit 170. Furthermore an optical system, such as for example one or more lenses (not shown) can also be disposed in the beam path of the illuminating radiation B or of the reflected radiation R. The device 100 further comprises a control device 190, which is connected by means of interfaces (not shown) to the image capturing unit 170, the illumination device 150, the scanner device 120 and the movable mechanism 140.

For processing of the workpiece 200, the control device 190 guides the position of the laser beam L by means of the workpiece 200 along a predetermined path which constitutes the desired welding sequence. In order to recognize positioning errors and to be able to counteract them appropriately, the processing site is illuminated by means of illuminating radiation B and the reflected radiation R is detected and evaluated by the image capturing unit 170 during the process. From the evaluation, the control device 190 determines whether and to what extent a change to the path of the laser beam L is necessary. This change is carried out by the control device 190 by corresponding actuation of the scanner device 120 or of the movable mechanism 140. The type of evaluation of the captured image data is explained in greater detail with reference to the following figures.

Figure 1B:
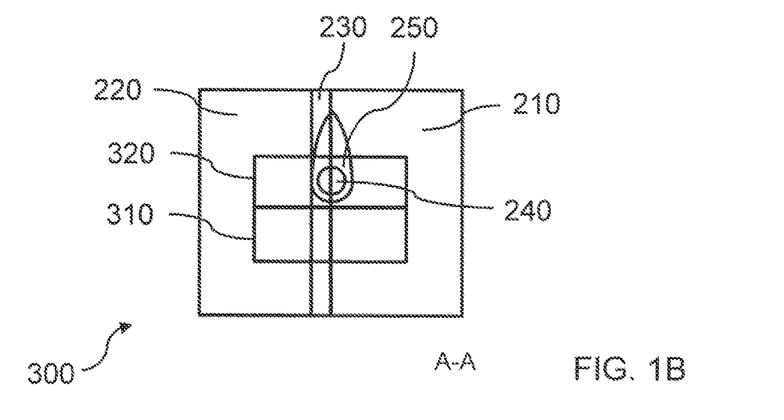
FIG. 1B shows a plan view A-A of the processing site on the workpiece 200 according to FIG. 1A corresponding to a viewing window of the image capturing unit.

FIG. 1B shows the viewing window 300 of the image capturing unit 170 onto the workpiece 200. The two components 210 and 220 can be recognized, as well as the end face 230 of the second component 220, since the viewing of the workpiece 200 takes place at the angle $\alpha$. In FIG. 1B, the keyhole 240 is also shown, in which the laser beam L is directly effective. The keyhole 240 is surrounded by the melting zone 250. The process advance zone is located before the melting zone 250 in the welding direction.

With respect to edge tracing or for recognition of the location of the fillet, the image data captured in a search window 310 are evaluated. The search window 310 extends transversely with respect to the processing direction and detects the surface of both the first and the second component. The search window 310 is disposed before the process zone 240 and the melting zone 250 and detects at least the immediate process advance zone.

Furthermore, image data which are captured in a process window 320 are evaluated for the recognition of defects and welding errors. The process window 320 is disposed behind the search window 310 in the processing direction. It detects radiation from the process zone, which is to say from the region of the keyhole 240 and the adjacent melting zone 250.

With reference to FIGS. 2A to 2D it is explained by way of example how an adaptation of the angle of attack $\alpha$ depending of the fillet angle $\gamma$ takes place.

FIG. 2A again shows the workpiece 200 according to FIG. 1A and also shows schematically the configuration of the illuminating radiation B and of the reflected radiation R. The workpiece 200 consists of first and second components 210 and 220 disposed above one another in the lap joint. The second component 220 has an end face 230 which extends approximately perpendicular to the surface 212 of the first component 210. The angle $\gamma$ enclosed by the end face 230 and the surface 212 of the first component 210 is between 85° and 95°. Thus, the fillet delimited by the end face 230 and the surface 212 has an aperture angle or fillet angle $\gamma$. For such a fillet geometry a reliable edge recognition for a wide range of angles of attack $\alpha$ is possible, for example the angle of attack $\alpha$ in a range from 0° to 45° or in a range from 5° to 40°.

Figure 2A:
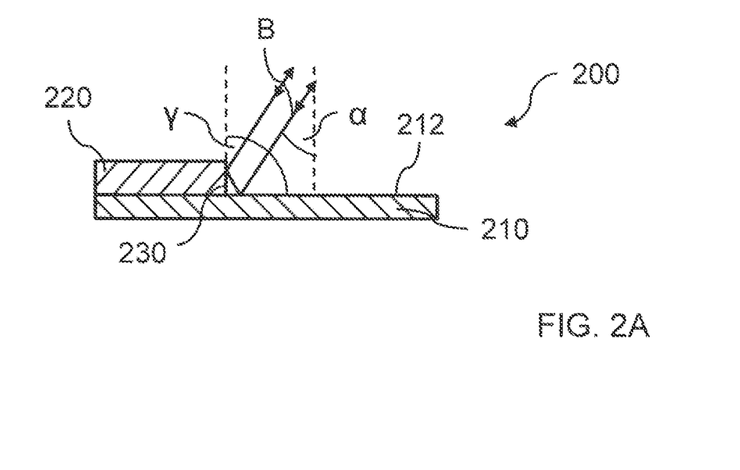
FIGS. 2A to 2D show cross-sectional views of workpieces 200, 200A, 200B and 200C for illustration of the adaptation of the angle of attack as a function of the fillet angle.
Figure 2B:
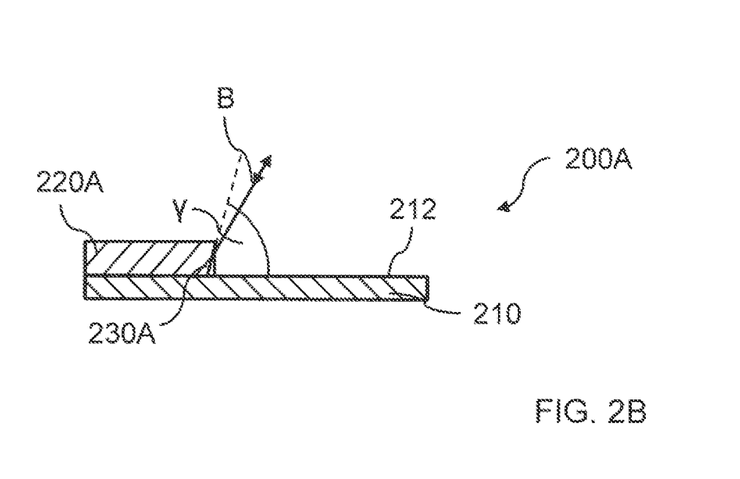

The workpiece 200A shown in FIG. 2B differs from the workpiece 200 in that a second component 220A with an acute cutting angle is used, so that an acute fillet angle $\gamma$ between the end face 230A of the second component 200A and the surface 212 of the first component is produced, i.e. a fillet angle of 85° or less. A reliable edge recognition is only possible here if the angle of attack is set as a function of the fillet angle $\gamma$, i.e. $\alpha=f(\gamma)$ applies for the angle of attack $\alpha$. For example, a reliable edge recognition is provided if $\alpha=2\times(90°-\gamma)$ applies.

Figure 2C:
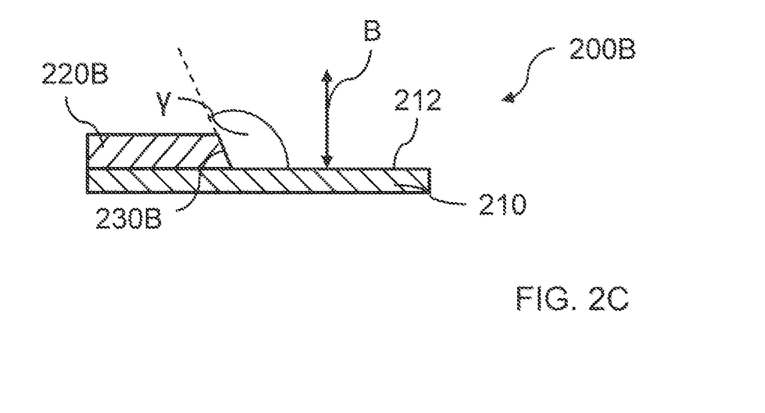

The workpiece 200B shown in FIG. 2C differs from the workpiece 200 in that a second component 220B with an obtuse cutting angle is used, so that an obtuse fillet angle $\gamma$ between the end face 230B of the second component 200B and the surface 212 of the first component is produced, i.e. a fillet angle of 95° or more. A reliable edge recognition is possible here, for example, if the illuminating radiation is directed as incident light onto the component surface 212 or the end face 230B. In this case, for example, the angle of attack may be in a range from 0° to 10° or for example $\alpha=(\gamma-90°)$ may apply.

Figure 2D:
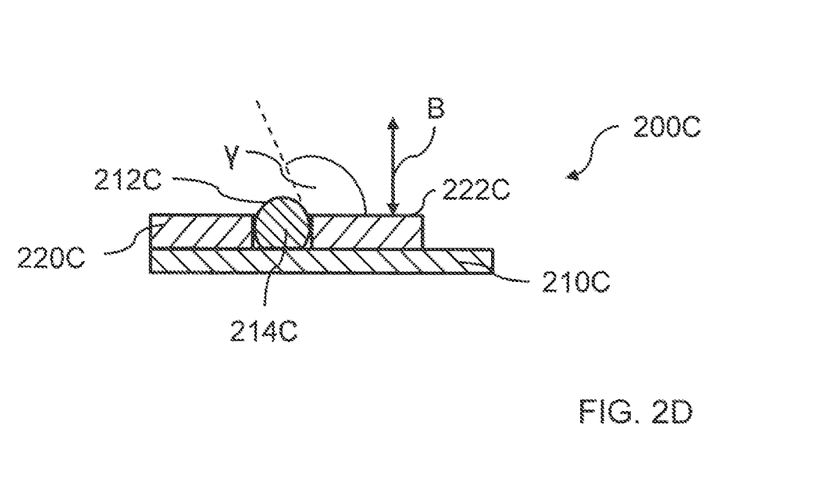

FIG. 2D shows a further embodiment with a workpiece 200C, with a first component 210C and a second component 220C disposed above the first. The first component 210C has a fastening element 214C which is fastened by cohesive bonding to the first component 210C. Alternatively, the fastening element can also be fastened by non-positive engagement or by positive engagement, or a plurality of fastening elements may be provided. The fastening element 214C penetrates the second component 220C in the region of an opening and projects over the surface 222C of the second component 220C. For welding of the fastening element 214C to the second component 220C, the fillet angle $\gamma$ to be taken into consideration is produced between the surface 222C of the second component 220C on the required joining point and the tangent to the surface 222C of the fastening element 214C in the region of the joining point. According to FIG. 2D the fillet angle is an obtuse angle and thus the angle of attack would be chosen, as described with regard to FIG. 2C.

Through the adjustment of the angle of attack as described above, as a function of the geometry on the fillet, a sufficient reflection of the illuminating radiation B is ensured so that an evaluation is also ensured in the case of difficult edge geometries.

The reflected radiation is captured by the image capturing unit 170. The image data are evaluated with regard to the grey scale values. Regions in which a light reflection takes place appear in the grey scale representation as light regions, whereas region without or with low reflection appear as dark regions. From this, conclusions can be drawn as to the geometry present, for example, to obtain the position of an edge or a gap. The position data thus obtained can be used in order to check the position of the laser beam and, if need be, to correct it.

Figure 3:
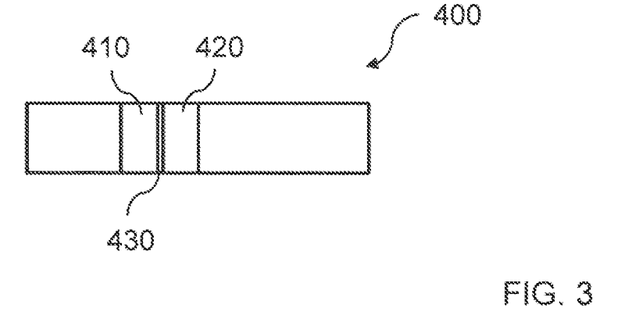
FIG. 3 shows a schematic grey scale representation of the image data of the process advance zone for the workpiece according to FIG. 2A.

FIG. 3 shows, by way of example, a schematic grey scale representation of the image data of the process advance zone for the component according to FIG. 2A. The grey scale representation 400 shows two light regions 410 and 420, and a dark region 430 located between them. The two light regions are produced by reflection on the end face 230 of the workpiece 200. The dark region 430 is produced due to a gap between the first component 210 and the second component 220. Depending upon size of the gap, changes can be made to the welding parameters or the laser beam can be positioned differently on the workpiece. This can be achieved by the control device 190 by means of an evaluation of the dark region 430, such as for example the width of the dark region 430, using evaluation algorithms.

Figure 4:
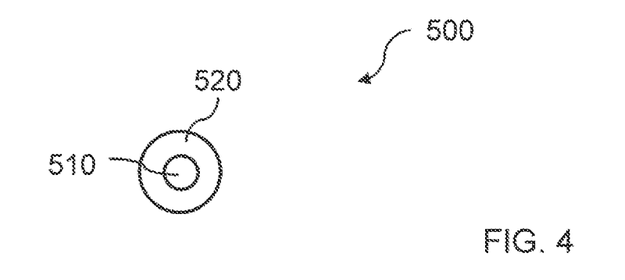
FIG. 4 shows a schematic grey scale representation of the image data of the process zone for the workpiece according to FIG. 2A.

In order further to increase the process reliability, in addition to the process advance zone the process zone can also be captured by the image capturing unit and the image data can be evaluated. FIG. 4 shows an example of a grey scale representation 500 of the image data of the process zone for the workpiece 200 shown in FIG. 2A, wherein the laser beam is positioned on the fillet. The grey scale representation shows a dark region or spot 510 which is surrounded by a light region 520. From the size of the dark spot 510 conclusions can be drawn as to the position of the laser beam. For example, if the laser beam is positioned on the second component 220, because of the lack of penetration welding, no dark spot would be present. Likewise, a process error, such as for example a hole, would be recognizable by the absence of the process light.

Figure 5:
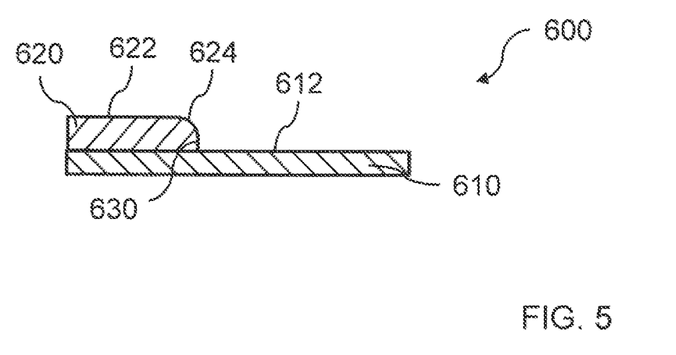
FIG. 5 shows a particularly advantageous configuration of the components used.

FIG. 5 shows a workpiece 600 with a particularly advantageous configuration of the components used for the production of an end fillet weld. In this configuration, an upper sheet 620 is disposed on a surface 612 of a lower sheet 610. The upper sheet 620 has on its surface 622 facing away from the lower sheet 610 a convex portion 624 which adjoins the end face 630. The convex portion can be formed as a rounded edge with a predetermined radius and can merge without edges into the end face 630. Alternatively, the convex portion can also be separated by an edge from the end face 630. At least a part of the convex portion 624 faces in the direction of the scanner device so that the reflection of the illuminating light is improved and the edge or fillet recognition can be increased. A corresponding shaping on the upper sheet 620 can be achieved, for example, by a corresponding shaping on the pressing tools to produce the sheet blank.

The components 210, 210C, 220, 220A, 220B, 220C, 220D, 610 and 620 shown in the embodiment are preferably metal sheets, in particular metal sheets coated with zinc or aluminum. Although the components are shown as flat metal sheets, as an alternative three-dimensional shaped metal sheets can also be used.

Figure 6:
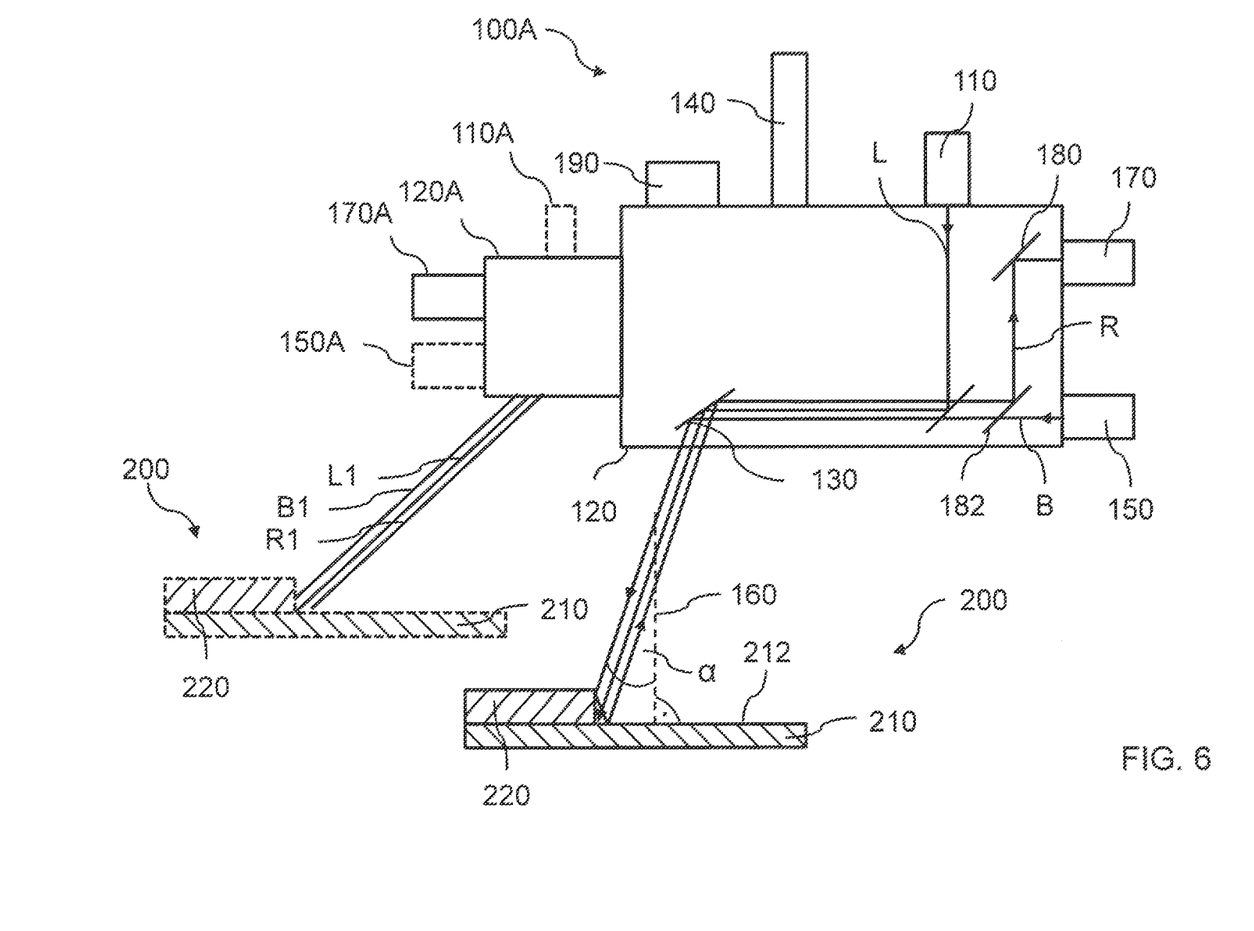
FIG. 6 shows a schematic representation of a device according to the invention according to a second embodiment for illustration of the leading edge recognition.

FIG. 6 shows a schematic representation of a device, according to the invention, according to a second embodiment for illustration of the preliminary edge recognition. The device 100A has the same components as the device 100, according to the first embodiment. In this respect, a repeated description of these components is omitted. Additionally, the device 100A according to the second embodiment has a second scanner device 120A and a second image capturing unit 170A. The elements provided in the second scanner device 120A for beam guiding, such as for example mirrors or lenses, are not illustrated. As shown by broken lines in FIG. 6, the device 100A can have an optional additional processing laser 110A, and/or an optional second illumination device 150A. The additional processing laser 110A can be mounted on the second scanner device 120A. Alternatively, the additional processing laser beam L1 can also be coupled into the scanner device 120A via an optical fiber. The radiation B1 from the second illumination device 150A is preferably guided by the second scanner device 120A at least partially coaxially with respect to the beam L1 of the additional processing laser 110A. Likewise, the radiation R1 guided towards the second image capturing unit 170A is preferably guided at least partially coaxially with respect to the additional processing laser beam L1. The activation of the second scanner device 120A, the second image capturing unit 170A, the additional processing laser 110A and the second illumination device 150A preferably takes place by means of the control device 190. Likewise, data can be transmitted by the image capturing unit 170A to the control device 190.

For preliminary edge recognition, the second image capturing unit 170A captures a fillet or edge portion of the workpiece which is located before the process zone in the processing direction. The should be made clear in FIG. 6 through the dual illustration of the workpiece 200, wherein the representation of the workpiece 200 by broken lines represents the region of the advance edge recognition. The advance for the edge recognition can be selected by means of the second scanner device 170A independently of the processing site by the processing laser beam L. The feed may be, for example, in the region of the immediate process feed zone. Advantageously, when the second scanner device 120A is used, in particular together with the second illumination device 150A, a preliminary edge recognition can also take place in regions clearly before, for example several millimeters or centimeters before, the immediate process advance zone.

Figure 7:
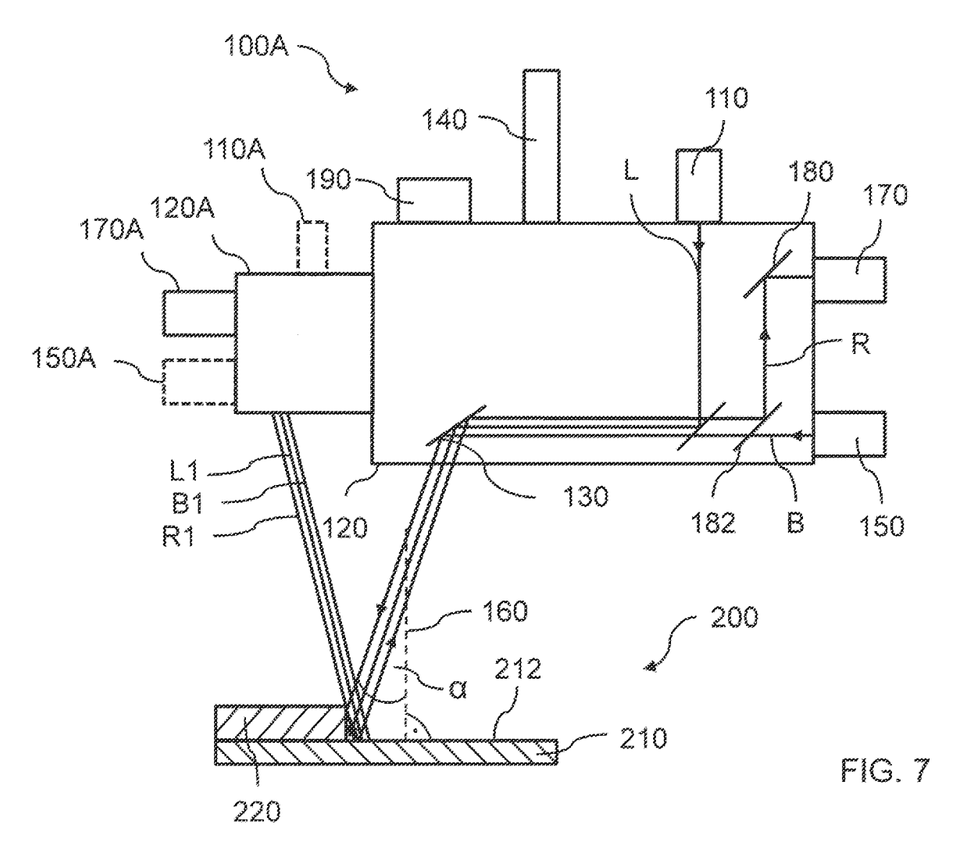
FIG. 7 shows a schematic representation of a device according to the invention according to the second embodiment for illustration of the quality assurance and seam smoothing.

FIG. 7 shows a schematic representation of the device according to the invention according to the second embodiment for illustration of the quality assurance and seam smoothing or advance component preparation.

For the component preparation, for example preheating, zinc removal or cleaning, the additional processing laser beam L1 is guided over the workpiece by the second scanner device 120A chronologically before the processing laser beam L. Likewise, the additional processing laser beam L1 can be used in order subsequently to treat the site, for example the welded seam, processed by the processing laser, for example by subsequent seam smoothing or correction of recognized and remediable welding errors.

For quality assurance, according to FIG. 7 the field of view of the second image capturing unit 170A is directed onto the processing site by means of the second scanner device. The evaluation of the data of the first and second image capturing units 170 and 170A enables improved error detection.

The embodiments are not to scale and are not limiting. Modifications in the context of specialist activity are possible.

LIST OF REFERENCE SIGNS 100, 100A device for laser remote processing
110, 110A laser source
120, 120A scanner device
130 movable mirror
140 movable mechanism
150, 150A illumination device
160 vertical
170, 170A image capturing unit
180, 182 mirror
190 control device
200, 200A, 200B, 200C, 600 workpiece
210, 210B, 210C first component
212, 222C surface
220, 220A, 220B, 220C second component
230, 230A, 230B end face
240 keyhole
250 melting zone
300 viewing window
310 search window
320 process window
400, 500 grey scale representation
410, 420, 520 light region
430, 440, 450, 510 dark region
610 lower sheet
612, 622 surface
620 upper plate
624 convex portion
630 end face
B, B1 illuminating radiation L, L1 laser beam for processing
R, R1 reflected radiation
α angle of attack
γ fillet angle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for laser remote processing of a component to produce a fillet, wherein the method comprises the acts of:
    directing, by a scanner device, a laser beam onto the component, wherein the laser beam is further guided over said component;
    illuminating, by illuminating radiation, a working range of the laser beam on the workpiece, wherein the illuminating radiation is directed onto the component at an angle of attack which is set as a function of a geometry of the fillet;
    capturing image data, from the working range, by at least one image capturing unit; and
    evaluating the captured image data automatically and, if appropriate, an automatic correction of a path of the laser beam is carried out on the basis of said evaluating.

2. The method according to claim 1, wherein the angle of attack is predetermined as a function of a fillet angle.

3. The method according to claim 1, further comprising evaluating reflected radiation which is reflected out of an immediate process advance zone.

4. The method according to claim 1, wherein said evaluating comprises determining a grey scale value.

5. The method according to claim 1, wherein said evaluating comprises evaluating the captured image data with regard to contrast.

6. The method according to claim 1, wherein a fillet weld is formed in the fillet.

7. The method according to claim 1, wherein the component consists of two metal sheets which are disposed in a lap joint and are connected to one another by means of an end fillet weld.

8. The method according to claim 7, wherein the metal sheets are zinc-coated steel sheets.

9. The method according to claim 1, wherein evaluating the captured image data comprises evaluating the captured image data to determine a gap dimension on the fillet.

10. The method according to claim 1, wherein evaluating the captured image data further comprises taking process light into consideration and, based on said evaluating, the method further comprises remedying remediable processing shortcomings by changing a path of the laser beam.

11. The method according to claim 10, wherein evaluating the captured image data further comprises evaluating the captured image data with regard to processing errors which are no longer remediable and, if appropriate, generating an error signal.

12. The method according to claim 1, wherein an end fillet weld is formed between an end face of an upper sheet and an adjacent surface of a lower sheet, and the upper sheet has, on a surface facing away from the lower sheet, a convex portion which adjoins the end face of the upper sheet.

13. A device for laser remote processing of a workpiece with a fillet, the device comprising:
    a first scanner device;
    a laser source, from which a laser beam is directed, using the first scanner device, over the workpiece;
    an illumination device configured to illuminate a working range of the laser beam with illuminating radiation, wherein the illuminating radiation is directed onto the component at an angle of attack which is set as a function of a geometry of the fillet
    a first image capturing unit configured to capture image data from a processing region of the laser beam; and
    a control device configured to correct a path of the laser beam based on an evaluation of the captured image data, if appropriate.

14. The device according to claim 13, wherein the angle of attack is predetermined as a function of a fillet angle.

15. The device according to claim 13, wherein the control device is further configured to evaluate reflected radiation which is reflected out of an immediate process advance zone.

16. The device according to claim 13, wherein the control device is further configured to evaluate the captured image data by determining a grey scale value.

17. The device according to claim 13, wherein the component consists of two metal sheets which are disposed in a lap joint and are connected to one another by means of an end fillet weld.

18. The device according to claim 13, wherein the control device is further configured to evaluate the captured image data by determining a gap dimension on the fillet.

19. The device according to claim 13, wherein the control device is further configured to evaluate the captured image data by taking process light into consideration and, based on said evaluating, remedying remediable processing shortcomings by changing a path of the laser beam.

20. The device according to claim 13, wherein an end fillet weld is formed between an end face of an upper sheet and an adjacent surface of a lower sheet, and the upper sheet has, on a surface facing away from the lower sheet, a convex portion which adjoins the end face of the upper sheet.

* * * * *